Feb. 19, 1957 D. R. ROBINSON 2,781,554
METHOD AND APPARATUS FOR MAKING TILE PANELS
Filed March 2, 1956 2 Sheets-Sheet 1

INVENTOR.
DONALD R. ROBINSON
BY
ATTORNEY

Feb. 19, 1957   D. R. ROBINSON   2,781,554
METHOD AND APPARATUS FOR MAKING TILE PANELS
Filed March 2, 1956   2 Sheets-Sheet 2
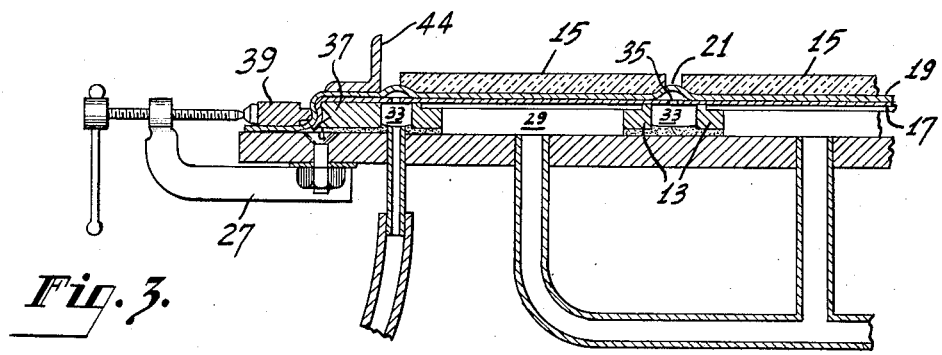
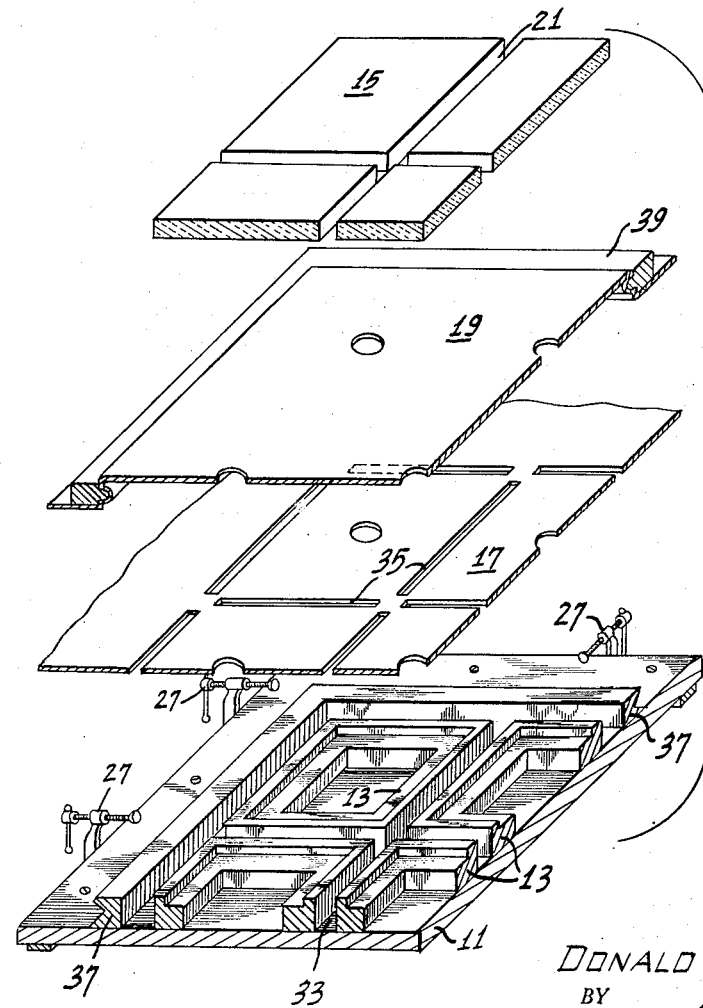
INVENTOR.
DONALD R. ROBINSON
BY
ATTORNEY 2,781,554
Patented Feb. 19, 1957

2,781,554
METHOD AND APPARATUS FOR MAKING TILE PANELS

Donald R. Robinson, Tottenville, N. Y., assignor to Tile Council of America, Incorporated, a corporation of New York Application March 2, 1956, Serial No. 569,178

12 Claims. (Cl. 18—61)

The present invention relates to the fabrication of panels from multiple elements and more particularly to panels of ceramic tiles.

The use of prefabricated, multiple tile panels offers many advantages over conventional methods of installing single tile units on the construction site. An important advantage to be gained from the use of prefabricated panels is a lower installation cost due to pre-grouting and pre-assembly. A wider choice of forms of grout material including superior grouting materials are available for use in prefabrication methods. Prefabrication of tile panels permits accurate control of tile spacing. Prefabrication permits the trimming and shaping of the panels to precisely the desired size and shape.

In the co-pending application of John V. Fitzgerald entitled Ceramic Tile Panels and Structural Members, Serial Number 471,748, filed November 29, 1954, there is shown and described ceramic tile panels consisting of a plurality of ceramic tiles positioned edge to edge. Panels such as shown and described in the application referred to immediately above lend themselves to prefabrication by the method taught and apparatus constructed in accordance with this invention.

The primary object of this invention is to provide an improved method and apparatus for the manufacture of ceramic tile panels and the like.

Another object of this invention is to provide apparatus which requires a minimum of operating time in the fabrication of panels.

Still another object of this invention is to permit increased accuracy in the fabricated panel with a minimum amount of effort on the part of the operator.

Other and incidental objects of the invention will become apparent after a reading of the following specifications and an inspection of the accompanying drawings wherein:

Figure 3 illustrates by cross section still another form of this invention, and

Figure 4 illustrates by exploded view the invention in one of its forms.

Throughout the various figures of the drawing the same numeral will be employed to designate the same element.

Figure 1:
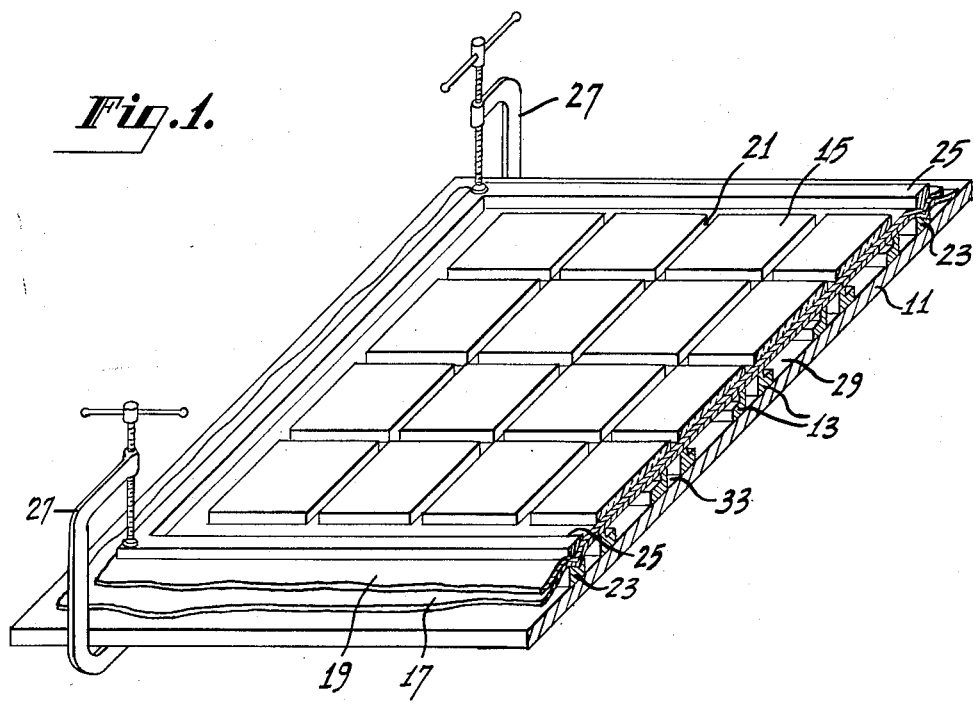
Figure 1 illustrates in perspective one form of this invention.

Turning now in detail to Figure 1 there is shown a base or table top 11 which forms a rigid support member. The base 11 supports a plurality of frame members 13 which consist essentially of a series of ridges forming a square whose dimension is slightly less than the dimension of the tile 15.

A pad or cushion 17 is spread over the frame members 13. The pad 17 may, for example, consist of a thin sheet of rubber. A flexible, elastic membrane 19 is spread over the pad 17. The tiles 15 are positioned symmetrically over the frame members 13 in the desired pattern. It will be understood that the frame members 13 will be so positioned as to allow a space between each of the tiles 15 to form a groove 21 into which it is intended to pour a liquid grout.

The base 11 also supports a lower frame work 23 whose upper surface is provided with a groove. The groove of the lower framework 23 is engaged by an upper framework 25 which is arranged to clamp and hold securely the pad 17 and the flexible elastic membrane 19. The upper framework 25 is engaged by clamps 27 and held securely in position in order that the tiles 15 may be conveniently arranged in the desired pattern.

Figure 2:
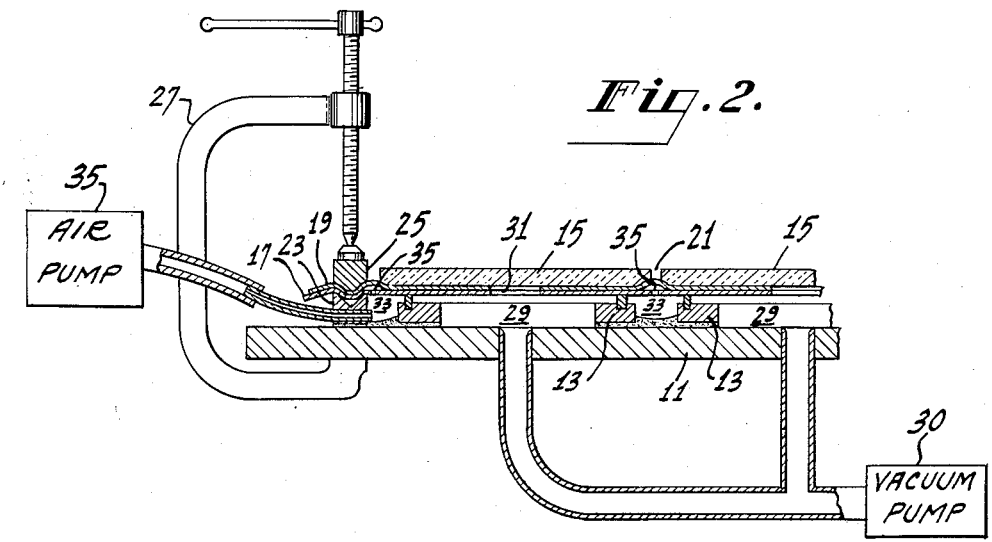
Figure 2 illustrates in cross section one form of this invention.

Turning now to Figure 2 there is shown details concerning one arrangement for obtaining a partial vacuum under each of the tiles 15 to hold them in position and an arrangement for causing a pressure under the flexible elastic membrane 19 at the location of the groove 21 between the tiles 15. By fastening the frame members 13 to the base 11 by any suitable method such as welding or by using an adhesive, a vacuum chamber 29 is formed under each of the tiles 15. By connecting each of the vacuum chambers 29 together and also to a vacuum pump a partial vacuum may be obtained in the vacuum chambers 29 in order to cause the atmosphere air pressure on the top of the tiles 15 to press the tiles 15 firmly against the frame members 13. A hole 31 is placed through the pad 17 and flexible elastic membrane 19 at about the center of each of the tiles 15 in order that the pad 17 and membrane 19 will not bulge into the vacuum chamber 29 when the vacuum chambers 29 are evacuated by a vacuum pump 30. Hole 31 causes each of the tiles 15 to directly form the upper part of the vacuum chambers 29. Atmospheric pressure on the tiles 15 holds them in place.

A series of inter-connected tunnels 33 will be formed between the various frame members 13. By connecting the series of tunnels 33 to an air pump 35 a pressure may be developed in the tunnels 33 which will bulge the flexible elastic members 19 up into the grooves 21 between the tiles 15 to form a concave surface in the bottom of the grooves 21 and also to provide a firm seal for the grooves 21 into which a liquid grout may be poured. An opening 35 is made in the cushion 17 under the grooves 21 in order to permit the air pressure in the tunnels 33 to force against the flexible elastic membrane 19.

The air pressure applied to the panels 33 is governed so that the force on the membrane 19 is sufficient to form a liquid-tight seal against the lower edges of the lower tiles 15 but not so great as to overcome the force of atmospheric pressure used to hold the tiles 15 in position.

In the form of the invention shown in Figure 2 the frame members 13 consist of a metal base having a groove in its upper surface to receive a resilient gasket of hard rubber, for example. The gaskets are of such a hardness that they will compress slightly when the atmospheric pressure causes the tile 15 to press against the frame members 13. The flexible gaskets in the frame members 13 will assist in the formation of an air seal between the frame members 13 and the tiles 15. The flexible gaskets provide the necessary cushion to overcome any slight irregularities in the glazed surface of the tile 15. Pad 17 need not be used for such purpose.

Turning now in detail to Figure 3 there is shown another form of this invention. In the form of the invention shown in Figure 3 the clamps 27 are arranged horizontally in such a manner as to permit easy access to the full surface of the apparatus. In arranging the clamps 27 in a horizontal position it is necessary that the framework binding the outside edges of the pad 17 and the flexible elastic membrane 19 consist of an inner framework 37 and an outer framework 39. By arranging the outer framework 39 so that it will compress pad 17 and flexible elastic membrane 19 between it and the inner framework 37 a satisfactory flexible element frame is provided.

In the form of the invention shown in Figure 3 there is also provided an over-all panel size framework guide 44 which consists essentially of an angle iron frame whose inside dimensions are equal to that of the panel as illustrated in Figure 3. The size of the framework 44 may also correspond to the outside dimension of the panel and fit snugly against the outside edges of the tile 15. The framework 44 serves to provide a form into which the grout may be poured should it be desired to provide a backing for the panel. The framework 44 also serves to keep the pad 17 and the flexible elastic membrane 19 from bulging around the outside edges of the panel.

In Figure 3 there is shown another form of frame member which consists essentially of a single piece metal casting whose upper and lower surfaces may be ground to provide a high degree of precision and thus provide a tile panel whose finished surface is uniform since the glazed or otherwise finished surface of each of the tiles 15 in the tile panel is exactly in the same plane.

Turning now in detail to Figure 4 there is shown an exploded view of one form of the invention to illustrate the relative position of the various components. The form of the air pressure tunnel 33 formed by the frame member 13 is clearly shown in Figure 4. The form of the opening 35 in the pad 17, is also clearly evident from an inspection of Figure 4 of the drawing. It will be seen that the openings 35 correspond substantially with the grooves 21 between the tiles 15.

Although in each of the forms of the invention illustrated in the drawing there is shown both a pad 17 and flexible elastic membrance 19, it will be understood that the pad 17 may be omitted if the flexible elastic membrane 19 is made sufficiently pliable to compensate for slight irregularities in the finished surface of the tile 15. Pad 17 need not extend through the clamps 27; it must however, be securely held in position.

The flexible elastic membrane 19 which is sometimes wetted or attached by the grout being used may be coated with a silicone oil or grease in a very thin layer and is then dusted lightly with a layer of low density silica powder or talc. Such a coating provides an excellent release characteristic from the effect of the silicone oil or grease and a smooth non-pitted surface due to the powdered layer. A thin polythylene film may be employed as a release agent.

The spacing of the tiles 15 forming the grooves 21 is kept uniform when the tiles 15 are placed in position with metal spacers (not shown) of approximately .05 inch in thickness. The spacers whether attached to a spacing jig or used loosely and individually, are removed before pouring the grout in the grooves 21. A joint width of approximately .05 inch has been selected as illustrative, any spacing of the tiles may be employed in the practice of this invention.

By employing the teachings of this invention a close control of the depth of the concave surface of the grout on the finished panel may obtained. By adjusting three variables; the magnitude of the pressure in the pressure tunnel 33, the elasticity of the flexible elastic membrane 19, and the thickness of the flexible elastic membrane 19, the shape of the bulge of the flexible elastic membrane 19 into the groove 21 is easily varied. The practical limits of the extent of variation of the pressure in the tunnels 33 is governed by the geometry of the size of the frame members 13 and the degree of vacuum which is maintained in vacuum chambers 29. The elasticity of the flexible elastic membrane 19 is generally fixed since pure gum rubber is usually preferred as the material because of its ability to resist permanent extensions. The proper thickness of the flexible elastic membrane may be so selected as to give the proper amount of extension into the grooves 21 under normal operating pressures.

By way of example, the following conditions have been found to give excellent results in the production of multiple element panels:

Vacuum—27 inches of mercury
Pressure—20 p. s. i.
Membrane—1/32 inch pure gum sheet as supplied by Goodyear Rubber Products Corp., 144 Mulberry St., Newark 2, New Jersey Although good quality grout is satisfactory for use in the practice of this invention, epoxy and polyester types of grout are particularly adaptable. A typical grouting material suitable for use in the practice of the present invention is Hysol–XL–2030–308c with 7.7% hardener C–1 as supplied by the Houghton Laboratories, Inc., 311 Bush St., Olean, New York. This grouting material is of the epoxy type and its low viscosity permits rapid pouring into the grooves 21 with no air entrapment.

Improved operation may be found by pre-heating the tiles 15. This is a further protection against air entrapment in the grooves 21. The heated tiles warm the plastic resin which decreases its viscosity and makes it flow more readily. The heating also aids in reducing the curing time of the grout since it has a positive temperature-hardening reaction rate relation. With pre-heated tiles and an application of radiant heat from infra-red lamps at a density of approximately 625 watts per square foot the grouting material will cure in less than one hour to a degree which permits handling of the panels and removal of the panels from the apparatus.

The problem of air bubble entrapment in the grout may be completely overcome by the replacement of the air atmosphere over the tiles 15 with a carbon dioxide atmosphere. The advantage to be gained is based on the chemical reaction between the amine type compounds used in the hardener for the grout with the carbon dioxide. Thus any bubbles of carbon dioxide which may have been entrapped in the pouring of the grout into the grooves 21 react chemically with amines to form solids which eliminate the gaseous pockets.

Apparatus constructed in accordance with the teachings of this invention and the methods proposed herein are especially adaptable to the fabrication of reinforced or composite types of panels. In the fabrication of a reinforced type panel the grouting material is spread over the full back of the tiles 15 as well as in the grooves 21. One or more laminations of fiber-glass cloth are then applied and the lamination adhesive cured simultaneously with the grout. An improved type of composite made in accordance with the teachings of this invention would consist of a core of paper aluminum, cotton, or fiber-glass honeycombed between two sheets of tile prefabricated in accordance with the teachings of this invention. The grouting resin would be applied over the full rear surface of the tiles 15 as well as in grooves 21. A layer of honeycomb would then be placed over the tiles 15. A second tile panel whose grouted joints have already been cured would then get a coating of the grouting material on its rear surface and be placed in position on top of the honeycomb. This composite would then be cured as a whole. In this manner a free standing, self-supported wall with two finished surfaces can be easily manufactured.

Having thus described the invention, what is claimed is:

1. Apparatus for holding tiles in position during setting of grout in the manufacture of tile panels, said apparatus comprising a panel support member having a series of ridges arranged to support each tile of the panel glazed surface toward the support member, said tiles positioned in spaced relation to form grooves between the tiles, said ridges also forming a cavity under each of the tiles and tunnels under the grooves between the tiles, a flexible element positioned between said tiles and said support member to provide a fluid seal between said ridges and said tiles, means for creating a partial vacuum in said cavities to hold said tiles in position, and means to create a pressure greater than atmospheric pressure in the tunnels under the grooves between the tiles to press said flexible element against said tiles whereby said flexible element forms a leak-proof bottom to said grooves in order that a fluid grout may be inserted in the grooves between the tiles to form a tile bonding agent for the panel.

2. The invention as set forth in claim 1 and wherein said flexible element consists of a rubber membrane covering said ridges in a uniform thickness.

3. The invention as set forth in claim 2 and wherein said rubber membrane has a hole under each tile.

4. The invention as set forth in claim 2 and wherein a pad is placed between said rubber membrane and said ridges and there is provided an opening in said pad under each of said tiles and under the grooves between the tiles.

5. Apparatus for holding tiles in position while the grout is setting in the grooves between the tiles during the manufacture of a tile panel, said apparatus comprising a flexible element, said flexible element adapted to receive a plurality of tiles finished surface toward said flexible element, said tiles spaced from each other to form grooves between the tiles, a cavity under said flexible element at the location of each of said tiles, means for developing a partial vacuum, means operatively connecting said partial vacuum developing means to each of the cavities to cause a partial vacuum in the cavities under the tiles whereby air pressure on the tiles will hold the tiles in position, a tunnel under said flexible element and the grooves between the tiles, means for developing air pressure greater than atmospheric pressure, and means operatively connecting said tunnel to said air pressure developing means whereby said flexible member will bulge into said grooves.

6. Apparatus for holding mosaic elements in position during the setting of a bonding agent in the grooves between the mosaic elements during the fabrication of a mosaic, said apparatus comprising a cushion, said cushion adapted to receive said mosaic elements in desired spaced position and with a finished surface toward said cushion, a cavity under each of said mosaic elements, means to develop a partial vacuum in said cavities to hold said mosaic elements in place, tunnels under said cushion at the location of said grooves between the mosaic elements, and means for developing a pressure in said tunnels whereby said cushion is pressed firmly against the edges of said mosaic elements to prevent a bonding agent in liquid form from flowing upon the finished surface of said mosaic elements.

7. Apparatus for holding tile in position during the setting of a bonding agent in the grooves between the tiles during the fabrication of a tile panel, said apparatus comprising a flexible element, said flexible element adapted to receive said tiles, finished surface toward said flexible element, and in a desired spaced relationship to form grooves between the tiles, a vacuum chamber under said flexible element at the location of each tile, a pressure chamber under said flexible element at the location of the grooves between the tiles, means for developing a partial vacuum in said vacuum chambers, and means for developing a pressure greater than atmospheric pressure under the grooves between the tiles to cause said flexible element to bulge into the grooves between the tiles whereby the finished surface on the bonding agent in the grooves will be concave.

8. Apparatus for making panels of tile comprising the combination a support member adapted to support a plurality of tiles on its surface, said tiles positioned edge to edge and separated from each other by spaces to form grooves between the tiles, a flexible element distributed on the surface of said support member between said support member and said tiles, means for developing a partial vacuum between said support member and at least part of the area of said tiles to hold said tiles in a desired position, means to develop a pressure greater than atmospheric pressure between said flexible element and said support member at the location of said grooves between the tiles to cause said flexible element to form a convex surface in the bottom of said grooves whereby a liquid bonding agent poured into said grooves will have a concave surface at the bottom of said grooves.

9. The method for the manufacture of tile panels comprising the steps of positioning a plurality of tiles edge to edge finished surface downward and separated from each other to form grooves between the tiles, creating a suction under each tile to hold the tiles in position, developing a convex surface in the bottom of the grooves between said tiles by creating a pressure greater than atmospheric pressure under the grooves between said tiles, filling the grooves between said tiles with a bonding agent, and maintaining said tiles in position until said bonding agent has set.

10. The method of manufacture of tile panels comprising the steps of positioning a plurality of tiles edge to edge, finished surface downward, the tiles separated from one another to form grooves between the tiles, creating a suction under each tile to hold the tile in position, causing a convex surface to be formed in the bottom of the grooves between the tiles by applying a liquid pressure greater than atmospheric pressure under the grooves between the tiles and pouring a grout into said grooves to bond said tiles together.

11. The method of manufacture of tile panels comprising the steps of positioning a plurality of tiles edge to edge, finished surface downward, the tiles separated from one another to form grooves between the tiles, causing a convex surface to be formed in the bottom of the grooves between the tiles by applying a liquid pressure greater than atmospheric pressure under the grooves between the tiles and pouring a grout into said grooves to bond said tile together.

12. Apparatus for making panels of tile comprising the combination a support member adapted to support a plurality of tiles on its surface, said tiles positioned edge to edge and separated from each other by spaces to form grooves between the tiles, a flexible element distributed on the surface of said support member between said support member and said tiles, means to develop a pressure greater than atmospheric pressure between said flexible element and said support member at the location of said grooves between the tiles to cause said flexible element to form a convex surface in the bottom of said grooves whereby a liquid bonding agent poured into said grooves will have a concave surface at the bottom of said grooves.

References Cited in the file of this patent

UNITED STATES PATENTS

| | | |
|---|---|---|
| 1,588,012 | Carrie | June 8, 1926 |
| 1,851,028 | Worrall | Mar. 29, 1932 |
| 1,968,189 | Bartels | July 21, 1934 |
| 2,266,510 | Pottinger | Dec. 16, 1941 |